C. H. MOORE.
HYDRANT.
No. 180,780. Patented Aug. 8, 1876.
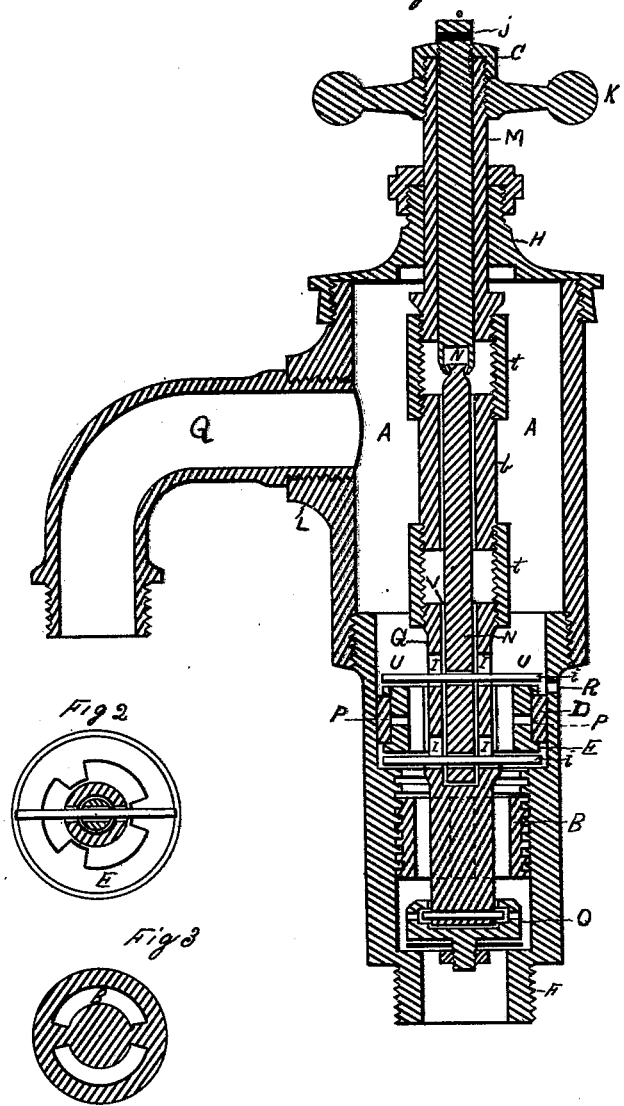
Witnesses,
Edgar S. Porter
Henry A. Johnson
Inventor,
Charles H. Moore

UNITED STATES PATENT OFFICE.

CHARLES H. MOORE, OF WESTFIELD, MASSACHUSETTS.

IMPROVEMENT IN HYDRANTS.

Specification forming part of Letters Patent No. 180,780, dated August 8, 1876; application filed January 15, 1876.

*To all whom it may concern:*

Be it known that I, CHARLES H. MOORE, of Westfield, in the county of Hampden and State of Massachusetts, have invented new and useful Improvements in Hydrants; and I do hereby declare that the following is a full, clear, and exact description thereof, reference being had to the accompanying drawing, making a part of this specification, in which—

Figure 1 represents a central vertical section of my improved hydrant. Fig. 2 is a horizontal section of hollow plunger. Fig. 3 is a horizontal section of hollow male nut on spindle.

The object of my invention is to produce a hydrant with an adjustable plunger, that can be arranged to cover waste-hole in valve-chamber through the warm months, and prevent any egress of water through waste-hole, and that can also be arranged in winter to permit all the water from nozzle to waste-hole, after the valve is closed, to escape—simple and certain in its operation, cheap, durable, and easily repaired.

A shows the barrel of hydrant, which may be made of wrought-iron pipe, with knob L cast or soldered on, into which nozzle Q is screwed. U represents a cylindrical valve-chamber, open at each end, having upon its inner side, near the center, a female screw-thread, into which a corresponding male, B, which is cast on spindle G, screws and operates the valve O, to permit or prevent the flow of water. The chamber U terminates with an extension, F, cast on it, on the outside of which a thread is cut of universal pipe size. O shows the swivel-valve, fitted upon the extreme end of valve-spindle G, and secured by means of a brass pin, as shown. The valve-spindle G has a hollow nut, B, cast on it, on the outside of which a thread is made to correspond with, and operate within, the female screw-thread, near center of valve-chamber. Upon the valve-spindle G, directly above the hollow nut B, is an adjustable hollow plunger, E, provided with two holes, P P, in the sides, into which water passes and compresses circular leather washer D on plunger against smooth inner surface of valve-chamber U, in which it works. Fitted upon plunger E is a circular leather, D, (which operates waste-hole R,) supported on the bottom by a flange, which projects horizontally outward, and on the top by a ring screwed on the end of plunger. Into the upper part of valve-spindle G is formed a cylindrical chamber, V, and four oblong holes, I I I I, for the purpose of regulating the adjustment of plunger E, as substantially shown.

The hollow valve-rod $b$ is affixed to valve-spindle G and hollow spindle M of the handle, by means of screw-couplings $t\ t$. N represents a swivel-rod, which enters to the bottom of cylindrical chamber V in valve-spindle G, and passes vertically through the hollow valve-rod $b$ and stem of handle M, and is worked by means of a screw in the top packing-nut C, as shown. The plunger E, through which the valve-spindle G passes, and rotates in, is secured on spindle G, and to the swivel-rod N, by means of two pins, passing through holes I I I I in spindle G, into holes in swivel-rod N, as substantially shown, and for the purpose specified.

In practice, the hydrant is put in by screwing the end F of valve-chamber U into a corresponding water-fitting, or by connecting it with a brass coupling to lead pipe. By turning the handle K, the valve O is raised from its seat and the water permitted to pass around the same, through the hollow nut B and plunger E, into barrel A, and out at nozzle Q.

When the valve O is raised, the plunger is also raised enough to cover waste-hole R and prevent any escape of water; and when the valve is seated, the plunger is below the waste-hole, and the water from nozzle to waste-hole is permitted to escape.

By putting a pin into the hole $j$, near the top of swivel-rod N, and turning the same to its limits, the plunger E is raised enough to cover the waste-hole R, (without opening the valve,) and prevent any egress of water, either when valve is open or shut.

By unscrewing the cap H from the body of hydrant, and turning the hollow nut B from its place, the valve can be easily lifted out for repairs.

The especial advantages possessed in this hydrant are, by adjusting the plunger and covering the waste-hole—to prevent any egress of water through the same for seven or eight months, when there is no danger from frost—first, you economize greatly in the use of water; second, when the waste-hole is covered, the hydrant is always full, and you get water upon the instant of raising valve; third, the ground around the valve being kept dry for seven or eight months, is much better prepared to contain the water that is necessary to waste through the cold season, than if there was always a waste after using, as is generally the case; fourth, the hollow plunger, having holes in the sides, permits the water, when passing through it, to press circular leather washer on plunger against waste-hole, making it perfectly secure from any leakage when valve is open; fifth, the device is very simple in construction, exceedingly durable, and not liable to get out of order.

Having thus given the merits of my invention, what I claim as new, and desire to secure by Letters Patent, is—

1. The combination of rod N, valve-rod G, having slot I I, with plunger E.

2. The combination of the valve-spindle G with hollow nut on it, and slot I I, with the rotary hollow plunger E, and swivel-valve O, as shown.

3. The hollow adjustable plunger E, with holes P P in the side, substantially as shown, and for the purpose specified.

This specification of my invention signed by me this 31st day of December, 1875.

CHARLES H. MOORE.

Witnesses:
G. V. HAYDEN,
H. C. ALLEN.